US012686619B2

(12) United States Patent
Ikoma et al.

(10) Patent No.: US 12,686,619 B2
(45) Date of Patent: Jul. 21, 2026

(54) MATERIAL, METHOD FOR PRODUCING MATERIAL AND FUNCTIONAL MATERIAL

(71) Applicant: SEKISUI CHEMICAL CO., LTD., Osaka (JP)

(72) Inventors: Atsushi Ikoma, Tsukuba (JP); Junichiro Anzai, Tsukuba (JP); Sachiko Satou, Tsukuba (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 461 days.

(21) Appl. No.: 18/275,732

(22) PCT Filed: Feb. 8, 2022

(86) PCT No.: PCT/JP2022/004861
§ 371 (c)(1),
(2) Date: Aug. 3, 2023

(87) PCT Pub. No.: WO2022/168987
PCT Pub. Date: Aug. 11, 2022

(65) Prior Publication Data
US 2024/0294384 A1     Sep. 5, 2024

(30) Foreign Application Priority Data

Feb. 8, 2021     (JP) ................................. 2021-018226

(51) Int. Cl.
*C01B 32/30*      (2017.01)
*B01J 20/22*      (2006.01)
(52) U.S. Cl.
CPC ............. *C01B 32/30* (2017.08); *B01J 20/226* (2013.01); *C01P 2002/30* (2013.01);
(Continued)

(58) Field of Classification Search
CPC ......... C01B 32/30; C01B 32/00; C01B 39/00; C01B 32/306; C01B 32/312;
(Continued)

(56) References Cited

U.S. PATENT DOCUMENTS 10,711,140 B2     7/2020   Costantino et al.
2008/0220329 A1   9/2008   Kojima et al.
(Continued)

FOREIGN PATENT DOCUMENTS

CN      106663547       5/2017
JP      2011-126775     6/2011
(Continued)

OTHER PUBLICATIONS

Liu, et al., Metal-organic framework (MOF) as template for synthesis of nanoporous carbons as electrode materials for supercapacitor, Carbon 2010; 48: 456-463 (Year: 2010).*
(Continued)

*Primary Examiner* — Daniel C. Mccracken
(74) *Attorney, Agent, or Firm* — Wenderoth, Lind & Ponack, L.L.P.

(57)     ABSTRACT

A porous carbon material which is a single porous carbon material having micropores, mesopores and macropores, wherein, with respect to a total pore volume, the volume percentage of the micropores is 13 to 74 volume %, the volume percentage of the mesopores is 13 to 75 volumes, and the volume percentage of the macropores is 5 to 74 volume %.

9 Claims, 3 Drawing Sheets

(52) U.S. Cl.
　　CPC ...... *C01P 2004/62* (2013.01); *C01P 2004/64*
　　　　　　(2013.01); *C01P 2006/14* (2013.01)
(58) Field of Classification Search
　　CPC ..... C01B 32/318; C01B 32/324; C01B 32/33;
　　　　　　C01B 32/336; C01B 32/342; C01B
　　　　　　32/348; C01B 32/354; C01B 32/36; C01B
　　　　　　32/366; C01B 32/372; C01B 32/378;
　　　　　　C01B 32/382; C01B 32/384; C01B 32/39;
　　　　　　B01J 20/226; B01J 20/28007; B01J
　　　　　　20/28016; B01J 20/28069; B01J
　　　　　　20/28092; B01J 20/3078; B01J 20/20;
　　　　　　C01P 2002/30; C01P 2004/62; C01P
　　　　　　2004/64; C01P 2006/14
　　See application file for complete search history.

(56) References Cited

U.S. PATENT DOCUMENTS

| | | | |
|---|---|---|---|
| 2011/0144365 A1 | 6/2011 | Park et al. | |
| 2012/0313053 A1 | 12/2012 | Fujii et al. | |
| 2016/0237314 A1 | 8/2016 | Williams et al. | |
| 2017/0015559 A1* | 1/2017 | Costantino | C08G 8/22 |
| 2018/0221851 A1 | 8/2018 | Petruska et al. | |
| 2018/0294484 A1 | 10/2018 | Fredrick et al. | |
| 2019/0043675 A1 | 2/2019 | Kobayashi et al. | |

FOREIGN PATENT DOCUMENTS

| | | |
|---|---|---|
| JP | 4728142 | 7/2011 |
| JP | 2011-178588 | 9/2011 |
| JP | 2014-34475 | 2/2014 |
| JP | 2016-537445 | 12/2016 |
| JP | 2017-522417 | 8/2017 |
| JP | 2017-532283 | 11/2017 |
| JP | 2018-536268 | 12/2018 |
| JP | 2019-69866 | 5/2019 |
| JP | 2019-102712 | 6/2019 |
| JP | 2019-150261 | 9/2019 |
| JP | 2019-212611 | 12/2019 |
| JP | 2020-142960 | 9/2020 |
| WO | 2013/051680 | 4/2013 |
| WO | 2017/135405 | 8/2017 |

OTHER PUBLICATIONS

Pei et al., "Metal-Organic Frameworks Derived Porous Carbons: Syntheses, Porosity and Gas Sorption Properties", Chinese Journal of Chemistry, vol. 34, No. 2, Jan. 2016, pp. 157-174, XP071929193, ISSN: 1001-604X, DOI: 10.1002/CJOC.201500760.

Liu et al., "Metal-organic framework (MOF) as a template for syntheses of nanoporous carbons as electrode materials for supercapacitor", Carbon, Elsevier, vol. 48, No. 2, Feb. 2010, pp. 456-463, XP026756575, ISSN: 0008-6223, DOI: 10.1016/J.CARBON.2009. 09.061 [retrieved on Sep. 24, 2009].

Sun et al., "From metal-organic framework to carbon: toward controlled hierarchical pore structures via a double-template approach", Chemical Communication, vol. 50, No. 88, Jan. 2014, pp. 13502-13505, XP093278300, UK ISSN: 1359-7345, DOI: 10.1039/ C4CC06212D, Retrieved from the Internet: URL:https://pubs.rsc. org/en/content/articlepdf/2014/cc/c4cc06212d>.

Extended European Search Report issued May 27, 2025 in corresponding European Patent Application No. 22749858.1.

International Search Report issued Apr. 19, 2022 in International (PCT) Application No. PCT/JP2022/004861.

Office Action issued Mar. 12, 2026 in Chinese Patent Application No. 202280012624.8, with Search Report.

Notification letter issued May 12, 2026 in Japanese Application No. 2022-579648, with English translation.

* cited by examiner

FIG. 3

MATERIAL, METHOD FOR PRODUCING MATERIAL AND FUNCTIONAL MATERIAL

TECHNICAL FIELD

The present invention relates to a material, a method for producing the material and a functional material.

Priority is claimed on Japanese Patent Application No. 2021-018226, filed Feb. 8, 2021, the content of which is incorporated herein by reference.

BACKGROUND ART

Porous carbon materials such as activated carbon are used in various applications such as electrode materials, separation materials, sensor materials, spacer materials, and reinforcing materials.

The performance of porous carbon materials is affected by a pore diameter, a pore volume and the like.

PTL 1 discloses a method for producing carbon aerogel powder in which the pore structure formed during a production process remains almost unbroken.

In PTL 1, FIG. 7 shows a pore distribution of the carbon aerogel powder produced in examples. In FIG. 7, it can be understood that the pores of carbon aerogel powder are mainly mesopores, and almost no micropores or macropores are present.

PTL 2 discloses a capacitor using a porous carbon material having a mesopore percentage of 50 volume % or more as a negative electrode active material.

In PTL 2, FIG. 5 shows pore distributions before an activation treatment and after an activation treatment of porous carbon materials produced in examples. From FIG. 5, it can be understood that the pores before the activation treatment are mainly mesopores, almost no micropores or macropores are present, and the number of mesopores is increased by the activation treatment. In addition, in PTL 2, FIG. 6 shows a pore distribution of the porous carbon material after the activation treatment and a pore distribution of commercially available activated carbon. From FIG. 6, it can be understood that the pores of commercially available activated carbon are mainly micropores, and almost no mesopores or macropores are present.

CITATION LIST

Patent Literature

[PTL 1] Japanese Patent No. 4728142
[PTL 2] Japanese Patent Application Publication No. 2019-102712

SUMMARY OF INVENTION

Technical Problem

However, studies made by the inventors have revealed that the biased pore diameter distribution in carbon materials as in conventional techniques results in poor diffusibility of a substance (for example, electrolytic solution) in the pores, which may hinder sufficient realization of desired performance (for example, a capacitance property of a capacitor using a carbon material in an electrode).

When a plurality of carbon materials with different pore diameters are mixed, pores with a wider range of pore diameters can be present together, but there are problems such as an increase in the number of production steps, non-uniformity in heat resistance, and loss of benefit in application of large-diameter pores to micropores. Therefore, it is desirable to achieve a wide range of pore distribution with a single carbon material.

An object of the present invention is to provide a material that functions as a porous carbon material and allows excellent diffusibility of a substance, a method for producing the same, a functional material using this material, and a material production method that enables production of a single porous carbon material having micropores, mesopores and macropores with their respective percentages being not less than specific values.

Solution to Problem

The present invention has the following aspects.

[1] A porous carbon material which is a single porous carbon material having micropores, mesopores and macropores,
wherein, with respect to a total pore volume, the volume percentage of the micropores is 13 to 74 volume %, the volume percentage of the mesopores is 13 to 75 volume %, and the volume percentage of the macropores is 5 to 74 volume %.

[2] The porous carbon material according to [1],
wherein the porous carbon material includes agglomerates or aggregates containing a plurality of particles having a crystalline structure or a polyhedral structure.

[3] The porous carbon material according to [2],
wherein the average particle size of the particles is 2 nm to 500 nm.

[4] The porous carbon material according to any one of claims 1 to 3,
wherein the volume ratio represented by [volume of macropores]/[volume of mesopores] is 1.1 to 4.0.

[5] The porous carbon material according to any one of [1] to [4],
wherein the volume ratio represented by [volume of macropores]/[volume of micropores+volume of mesopores] is 0.14 to 1.5.

[6] The porous carbon material according to any one of [1] to [5],
wherein the pore diameter of the micropores is preferably less than 2 nm, more preferably more than 0 nm and less than 2 nm, and still more preferably 0.4 nm or more and less than 2 nm.

[7] The porous carbon material according to any one of [1] to [5],
wherein the pore diameter of the mesopores is 2 nm or more and 50 nm or less.

[8] The porous carbon material according to any one of [1] to [5],
wherein the pore diameter of the macropores is preferably more than 50 nm, and more preferably more than 50 nm and 400 nm or less.

[9] The porous carbon material according to any one of [1] to [8],
wherein the volume percentage of the micropores is more preferably 30 to 74 volume %, still more preferably 35 to 65 volume %, and yet more preferably 40 to 60 volume %.

[10] The porous carbon material according to any one of [1] to [9],
wherein the volume percentage of the mesopores is more preferably 13 to 70 volume %, still more preferably 20 to 68 volume %, and particularly preferably 30 to 65 volume %.

[11] The porous carbon material according to any one of [1] to [10], wherein the volume percentage of the macropores is more preferably 13 to 40 volume %, still more preferably 15 to 30 volume %, and particularly preferably 18 to 30 volume %.

[12] The porous carbon material according to any one of [1] to [11], wherein the total pore volume of the porous carbon material is preferably 0.5 to 5.0 $cm^3/g$, more preferably 1.0 to 5.0 $cm^3/g$, and still more preferably 1.1 to 5.0 $cm^3/g$.

[13] The porous carbon material according to any one of [1] to [12], wherein the $CO_2$ gas absorption amount of the porous carbon material is preferably 1 (mol $CO_2$/kg) or more, more preferably 2 (mol $CO_2$/kg) or more, and still more preferably 4 (mol $CO_2$/kg) or more.

[14] The porous carbon material according to any one of [1] to [13], wherein the dye adsorption amount of the porous carbon material is preferably 50 (ml/g) or more, more preferably 150 (ml/g) or more, and still more preferably 300 (ml/g) or more.

[15] The porous carbon material according to any one of [1] to [14], wherein, in the log differential pore volume distribution of the porous carbon material, the pore diameter at the peak top of the mesopore region is preferably 2 to 50 nm and more preferably 5 to 30 nm.

[16] The porous carbon material according to any one of [1] to [13], wherein, in the log differential pore volume distribution of the porous carbon material, the pore diameter at the peak top of the macropore region is preferably 50 to 200 nm and more preferably 50 to 100 nm.

[17] The porous carbon material according to any one of [1] to [16], wherein, in the log differential pore volume distribution of the porous carbon material, the difference between the pore diameter at the peak top of the mesopore region and the pore diameter at the peak top of the macropore region is preferably 10 to 200 nm and more preferably 30 to 100 nm.

[18] The porous carbon material according to any one of [2] to [17], wherein the agglomerates are obtained by aggregating the plurality of particles by physical interaction, and the aggregates are secondary particles in which the plurality of particles are connected via chemical bonds.

[19] The porous carbon material according to any one of [2] to [18], wherein the average particle size of the agglomerate or aggregate is preferably 0.05 to 3,000 μm, more preferably 0.1 to 1,000 μm, still more preferably 1 to 500 μm, and particularly preferably 10 to 100 μm.

[20] The porous carbon material according to any one of [2] to [19], wherein the average particle size of the particles is preferably 5 nm to 250 nm, more preferably 10 nm to 200 nm, and still more preferably 25 to 100 nm.

[21] The porous carbon material according to any one of [1] to [20], wherein the volume ratio represented by [volume of macropores]/[volume of mesopores] is preferably 1.2 to 3.0 and more preferably 1.3 to 2.5.

[22] The porous carbon material according to any one of [1] to [21], wherein the volume ratio represented by [volume of macropores]/[volume of micropores+volume of mesopores] is preferably 0.17 to 1.0 and more preferably 0.2 to 0.7.

[23] A composite material including the porous carbon material according to any one of [1] to [22] and at least one selected from the group consisting of metals and metal oxides, wherein the at least one selected from the group consisting of metals and metal oxides is supported on the porous carbon material.

[24] The composite material according to [23], wherein the metal is at least one selected from the group consisting of platinum, gold, palladium, rhodium, ruthenium, zinc, iron, nickel, and cobalt.

[25] The composite material according to [23] or [24], wherein the metal oxide is at least one selected from the group consisting of zinc oxide, cobalt oxide, nickel oxide, and iron oxide.

[26] The composite material according to any one of [23] to [25], wherein the content of the at least one selected from the group consisting of metals and metal oxides with respect to a total mass of the composite material is preferably more than 0 mass % and 10 mass % or less, more preferably more than 0.01 mass % and 8 mass % or less, and still more preferably 0.5 to 5 mass %.

[27] A composite material including the porous carbon material according to any one of [1] to [22] and an organic substance, wherein the organic substance is supported on the porous carbon material.

[28] The composite material according to [27], wherein the organic substance is at least one selected from the group consisting of sugars and proteins.

[29] The composite material according to any one of [27] to [28], wherein the content of the organic substance with respect to a total mass of the composite material is preferably more than 0 mass % and 10 mass % or less, more preferably more than 0.01 mass % and 8 mass % or less, and still more preferably 0.5 to 5 mass %.

[30] A composite material including the porous carbon material according to any one of [1] to [22] and a metal-organic framework, wherein the metal-organic framework is supported on the porous carbon material.

[31] The composite material according to [30], wherein the metal-organic framework is a framework in which an organic bridging ligand is coordinated to a metal ion, and the organic bridging ligand is a multidentate ligand having two or more coordinating functional groups.

[32] The composite material according to [31], wherein the metal ions are preferably at least one selected from the group consisting of zinc ions, cobalt ions, niobium ions, zirconium ions, cadmium ions, copper ions, nickel ions, chromium ions, vanadium ions, titanium ions, molybdenum ions, magnesium ions, iron ions, and aluminum ions and more preferably at least one selected from the group consisting of zinc ions and cobalt ions.

[33] The composite material according to [31] or [32], wherein the coordinating functional group is at least one selected from the group consisting of a carboxyl group, an imidazole group, a hydroxyl group, a sulfonic acid group, a pyridine group, a tertiary amine group, an amide group, and a thioamide group.

[34] The composite material according to any one of [31] to [33], wherein the organic bridging ligand is preferably at least one selected from the group consisting of a tricarboxylic acid having a phenyl group, a tricarboxylic acid having a phenyl group, any dicarboxylic acid having a phenyl group, and a compound having an imidazole group; more preferably at least one selected from the group consisting of 1,3,5-tris(4-carboxyphenyl)benzene, 1,4-benzenedicarboxylic acid, 2,5-dihydroxy-1,4-benzenedicarboxylic acid, cyclobutyl-1,4-benzenedicarboxylic acid, 2-amino-1,4-benzenedicarboxylic acid, tetrahydropyrene-2,7-dicarboxylic acid, terphenyl dicarboxylic acid, 2,6-naphthalene dicarboxylic acid, pyrene-2,7-dicarboxylic acid, biphenyl dicarboxylic acid, 3,3',5,5'-biphenyltetracarboxylic acid, imidazole, 2-methylimidazole, benzimidazole, 2-nitroimidazole, cyclobenzimidazole, imidazole-2-carboxaldehyde, 4-cyanoimidazole, 6-methylbenzimidazole, and 6-bromobenzimidazole; and still more preferably at least one selected from the group consisting of imidazole, benzimidazole, 2-nitroimidazole, 2-methylimidazole, cyclobenzimidazole, imidazole-2-carboxaldehyde, 4-cyanoimidazole, 6-methylbenzimidazole, and 6-bromobenzimidazole.

[35] The composite material according to any one of [31] to [35], wherein the metal-organic framework is more preferably at least one selected from the group consisting of $Zn_4O(1,3,5$-benzenetribenzoate$)_2$, $Zn_4O(1,4$-benzenedicarboxylate$)_3$, $Mg_2(2,5$-dihydroxy-1,4-benzenedicarboxylate$)$, $Zn_2(2,5$-dihydroxy-1,4-benzenedicarboxylate$)$, $Cu_2(3,3',5,5'$-biphenyltetracarboxylate$)$, $Zn_4O($cyclobutyl-1,4-benzenedicarboxylate$)$, $Zn_4O(2$-amino-1,4-benzenedicarboxylate$)_3$, $Zn_4O($terphenyl dicarboxylate$)_3$, $Zn_4O($tetrahydropyrene-2,7-dicarboxylate$)_3$, $Zn(2$-methylimidazolate$)_2$, $Zn($benzimidazolate$)(2$-nitroimidazolate$)$, $Zn($cyclobenzimidazolate$)(2$-nitroimidazolate$)$, $Zn($benzimidazolate$)_2$, $Co($benzimidazolate$)_2$, $Zn_2($benzimidazolate$)$, $Zn($imidazolate-2-carboxaldehyde$)_2$, $Zn(4$-cyanoimidazolate$)(2$-nitroimidazolate$)$, $Zn($imidazolate$)(2$-nitroimidazolate$)$, $Zn(6$-methylbenzimidazolate$)(2$-nitroimidazolate$)$, and $Zn(6$-bromobenzimidazolate$)(2$-nitroimidazolate$)$.

[36] The composite material according to any one of [31] to [35], wherein the metal-organic framework has a crystal structure, and the median value of the size of the crystal structure is preferably 2 nm to 1,000 μm and more preferably 5 nm to 100 μm.

[37] A method for producing the porous carbon material according to any one of [1] to [22], including firing a metal-organic framework or a mixture containing a metal-organic framework and other substances.

[38] The method according to [37], wherein the metal-organic framework is a framework in which an organic bridging ligand is coordinated to a metal ion, and the organic bridging ligand is a multidentate ligand having two or more coordinating functional groups.

[39] The method according to [38], wherein the metal ions are preferably at least one selected from the group consisting of zinc ions, cobalt ions, niobium ions, zirconium ions, cadmium ions, copper ions, nickel ions, chromium ions, vanadium ions, titanium ions, molybdenum ions, magnesium ions, iron ions, and aluminum ions and more preferably at least one selected from the group consisting of zinc ions and cobalt ions.

[40] The method according to [38] or [39], wherein the coordinating functional group is at least one selected from the group consisting of a carboxyl group, an imidazole group, a hydroxyl group, a sulfonic acid group, a pyridine group, a tertiary amine group, an amide group, and a thioamide group.

[41] The method according to any one of [36] to [40], wherein the organic bridging ligand is preferably at least one selected from the group consisting of a tricarboxylic acid having a phenyl group, a tricarboxylic acid having a phenyl group, any dicarboxylic acid having a phenyl group, and a compound having an imidazole group; more preferably at least one selected from the group consisting of 1,3,5-tris(4-carboxyphenyl)benzene, 1,4-benzenedicarboxylic acid, 2,5-dihydroxy-1,4-benzenedicarboxylic acid, cyclobutyl-1,4-benzenedicarboxylic acid, 2-amino-1,4-benzenedicarboxylic acid, tetrahydropyrene-2,7-dicarboxylic acid, terphenyl dicarboxylic acid, 2,6-naphthalene dicarboxylic acid, pyrene-2,7-dicarboxylic acid, biphenyl dicarboxylic acid, 3,3',5,5'-biphenyltetracarboxylic acid, imidazole, 2-methylimidazole, benzimidazole, 2-nitroimidazole, cyclobenzimidazole, imidazole-2-carboxaldehyde, 4-cyanoimidazole, 6-methylbenzimidazole, and 6-bromobenzimidazole; and still more preferably at least one selected from the group consisting of imidazole, benzimidazole, 2-nitroimidazole, 2-methylimidazole, cyclobenzimidazole, imidazole-2-carboxaldehyde, 4-cyanoimidazole, 6-methylbenzimidazole, and 6-bromobenzimidazole.

[42] The method according to any one of [38] to [41], wherein the metal-organic framework is more preferably at least one selected from the group consisting of $Zn_4O(1,3,5$-benzenetribenzoate$)_2$, $Zn_4O(1,4$-benzenedicarboxylate$)_3$, $Mg_2(2,5$-dihydroxy-1,4-benzenedicarboxylate$)$, $Zn_2(2,5$-dihydroxy-1,4-benzenedicarboxylate$)$, $Cu_2(3,3',5,5'$-biphenyltetracarboxylate$)$, $Zn_4O($cyclobutyl-1,4-benzenedicarboxylate$)$, $Zn_4O(2$-amino-1,4-benzenedicarboxylate$)_3$, $Zn_4O($terphenyl dicarboxylate$)_3$, $Zn_4O($tetrahydropyrene-2,7-dicarboxylate$)_3$, $Zn(2$-methylimidazolate$)_2$, $Zn($benzimidazolate$)(2$-nitroimidazolate$)$, $Zn($cyclobenzimidazolate$)(2$-nitroimidazolate$)$, $Zn($benzimidazolate$)_2$, $Co($benzimidazolate$)_2$, $Zn_2($benzimidazolate$)$, $Zn($imidazolate-2-carboxaldehyde$)_2$, $Zn(4$-cyanoimidazolate$)(2$-nitroimidazolate$)$, $Zn($imidazolate$)(2$-nitroimidazolate$)$, $Zn(6$-methylbenzimidazolate$)(2$-nitroimidazolate$)$, and $Zn(6$-bromobenzimidazolate$)(2$-nitroimidazolate$)$.

[43] The method according to any one of [38] to [42], wherein the metal-organic framework has a crystal structure, and the median value of the size of the crystal structure is preferably 2 nm to 1,000 μm and more preferably 5 nm to 100 μm.

[44] The method according to any one of [38] to [45], wherein, in the firing, the firing temperature is preferably 300 to 1,100° C., more preferably 600 to 1,050° C., and still more preferably 800 to 1,000° C.

[45] The method according to any one of [38] to [44], wherein, in the firing, the firing time is preferably 0.5 to 10 hours and more preferably 0.5 to 5 hours.

[46] The method according to any one of to [45], wherein the firing is preferably performed under an inert gas atmosphere; and more preferably performed under a gas atmosphere of at least one selected from the group consisting of nitrogen gas and argon gas.

[47] The method according to any one of [38] to [46], further including pulverizing the metal-organic framework.

[48] The method according to any one of [38] to [47], wherein, in the pulverizing, the metal-organic framework is pulverized to preferably an average particle size of 0.05 to 3,000 μm, more preferably 0.1 to 1,000 μm, still more preferably 1 to 500 μm, and particularly preferably 10 to 100 μm.

[49] The method according to any one of [38] to [48], further including mixing an organic bridging ligand, a substance containing metal ions, and a coordination accelerator, and coordinating the organic bridging ligand to the metal ion to obtain the metal-organic framework.

[50] A functional material including the porous carbon material according to any one of [1] to [22] or the composite material according to any one of [23] to [36].

[51] The functional material according to [50], which is an electrode material, a separation material, a sensor material, a spacer material, a reinforcing material, a gas adsorbent, a liquid adsorbent, an ion adsorbent, or a solid adsorbent.

[52] An electrode material including a current collector and an active material layer, wherein a current collector is provided in contact with the active material layer, and the active material layer contains the porous carbon material according to any one of [1] to [22].

[53] The electrode material according to [52], wherein the amount of the porous carbon material with respect to a total mass of the active material layer is preferably 60 to 100 mass % and more preferably 90 to 99 mass %.

[54] The electrode material according to [52] or [53], wherein the active material layer further preferably contains a conductive agent; and more preferably contains at least one selected from the group consisting of ketjen black and carbon nanotubes.

[55] The electrode material according to [54], wherein the amount of the conductive agent with respect to a total mass of the active material layer is preferably 0 to 15 mass % and more preferably 1 to 10 mass %.

[56] The electrode material according to any one of [52] to [55], wherein the active material layer further preferably contains a binder and more preferably contains at least one selected from the group consisting of polyacrylonitrile and cellulosic polymers.

[57] The electrode material according to [56], wherein the amount of the binder with respect to a total mass of the active material layer is preferably 0 to 10 mass % and more preferably 0 to 5 mass %.

[58] The electrode material according to any one of [52] to [56], wherein the current collector includes at least one selected from the group consisting of nickel, aluminum, copper, iron, and stainless steel.

[59] The electrode material according to any one of [52] to [58], wherein the current collector is preferably in the form of a sheet; more preferably a porous sheet or a non-porous sheet; and still more preferably a mesh or foam (foamed component).

[60] A method for producing the electrode material according to any one of [52] to [58], including preparing a composition containing the porous carbon material according to any one of [1] to [22]; and coating or impregnating a current collector with the composition.

[61] The method according to [60], wherein the composition further contains a medium, the method further includes performing drying after the coating or impregnating to remove the medium.

[62] The method according to [60] or [61], wherein the medium is preferably at least one selected from the group consisting of an organic solvent and water; and more preferably at least one selected from the group consisting of N-methylpyrrolidone and dimethylformamide.

[63] The method according to [60] to [62], wherein, when the medium is removed by drying, the drying temperature is preferably 80 to 200° C., more preferably 100 to 180° C., and still more preferably 125 to 175° C.

[64] The method according to [61] to [63], wherein, when the medium is removed by drying, the drying time is preferably 10 to 60 minutes and more preferably 15 to 45 minutes.

[65] The method according to [60] to [64], wherein the electrode material is an electrode of an electric double layer capacitor or an electrode of a hybrid capacitor.

[66] A use of the porous carbon material according to any one of [1] to [22], as an electrode material, a separation material, a sensor material, a spacer material, a reinforcing material, a gas adsorbent, a liquid adsorbent, an ion adsorbent, or a solid adsorbent in production of an electric double layer capacitor or a hybrid capacitor.

[67] The use according to [66], wherein an electrolyte in the electric double layer capacitor or the hybrid capacitor is at least one selected from the group consisting of an aqueous solution containing 1 M KOH, a polycarbonate solution containing 1 M tetrabutylammonium tetrafluoroborate, and a polycarbonate solution containing 1 M lithium tetrafluoroborate.

[68] The use according to [66] or [67], which is a use as an electrode material.

In addition, the present invention has the following aspects.

[1] A material which is a single porous carbon material having micropores, mesopores and macropores, wherein, with respect to a total pore volume, the volume percentage of the micropores is 13 to 74%, the volume percentage of the mesopores is 13 to 75%, and the volume percentage of the macropores is 5 to 74%.

[2] A material which is a composite material in which a metal or a metal oxide is supported on a single porous carbon material having micropores, mesopores and macropores, wherein, with respect to a total pore volume of the porous carbon material, the volume percentage of the micropores is 13 to 74%, the volume percentage of the mesopores is 13 to 75%, and the volume percentage of the macropores is 5 to 74%.

[3] A material which is a composite material in which an organic substance is supported on a single porous carbon material having micropores, mesopores and macropores, wherein, with respect to a total pore volume of the porous carbon material, the volume percentage of the micropores is 13 to 74%, the volume percentage of the mesopores is 13 to 74%, and the volume percentage of the macropores is 13 to 74%.

[4] A material which is a composite material in which a metal-organic framework is supported on a single porous carbon material having micropores, mesopores and macropores, wherein, with respect to a total pore volume of the porous carbon material, the volume percentage of the micropores is 13 to 74%, the volume percentage of the mesopores is 13 to 75%, and the volume percentage of the macropores is 5 to 74%.

[5] A method of producing the material according to [1], including a step of firing a metal-organic framework or a mixture containing a metal-organic framework and other substances.

[6] A functional material including the material according to any one of [1] to [4].

[7] The functional material according to [6], which is an electrode material, a separation material, a sensor material, a spacer material, a reinforcing material, a gas adsorbent, a liquid adsorbent, an ion adsorbent, or a solid adsorbent.

Advantageous Effects of Invention

According to the present invention, it is possible to provide a material that functions as a porous carbon material and allows excellent diffusibility of a substance, a method for producing the same, a functional material using this material, and a material production method that enables production of a single porous carbon material having micropores, mesopores and macropores with their respective percentages being not less than specific values.

BRIEF DESCRIPTION OF DRAWINGS

FIG. 3 is a cross-sectional view schematically showing an example of a secondary battery.

DESCRIPTION OF EMBODIMENTS

[Material (1)]

A material according to one aspect of the present invention (hereinafter also referred to as a "material (1)") is a single porous carbon material having micropores, mesopores and macropores. With respect to a total pore volume, the volume percentage of the micropores (hereinafter also referred to as a "micropore volume percentage") is 13 to 74 volume %, the volume percentage of the mesopores (hereinafter also referred to as "mesopore volume percentage") is 13 to 75 volume %, and the volume percentage of the macropores (hereinafter also referred to as a "macropore volume percentage") is 5 to 74 volume %.

The porous carbon material being "single" means that a plurality of particles having a crystalline structure or a polyhedral structure are agglomerated or connected to form one agglomerate or aggregate. The porous carbon material of the present invention may contain only one type of agglomerates or aggregates that satisfy the requirements of the present invention, and may be a mixture containing a plurality of types of agglomerates or aggregate that satisfy the requirements of the present invention. In addition, the configuration of the porous carbon material of the present invention may be a mixture also containing agglomerates or aggregates that do not satisfy the requirements of the present invention. When the porous carbon material of the present invention is a mixture, the amount of the agglomerates or aggregates that satisfy the requirements of the present invention with respect to a total mass of the porous carbon material is preferably 50 mass % or more, more preferably 80 mass % or more, and particularly preferably 95 mass % or more. When the porous carbon material of the present invention is a mixture, regarding various property values involved in the requirements of the present invention, it is preferable that the entire porous carbon material satisfy various property values in terms of respective average values.

Figure 1:
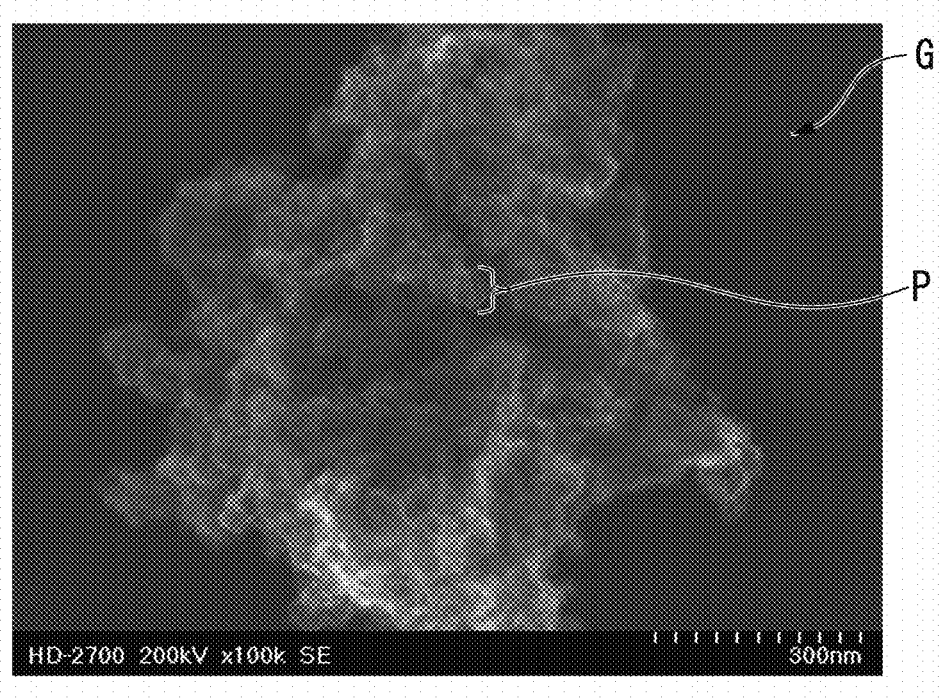
FIG. 1 is an example of a scanning electron microscope (SEM) image of an aggregate included in a porous carbon material of the present invention.

FIG. 1 is an example of a scanning electron microscope (SEM) image of an aggregate constituting the porous carbon material of the present invention. In FIG. 1, the average particle size of particles P constituting an aggregate G is about 30 nm. In the aggregate G in FIG. 1, a plurality of particles P are connected to form one aggregate G. In this specification, "aggregate" refers to secondary particles in which a plurality of particles are connected via chemical bonds. Examples of chemical bonds include covalent bonds such as —C—C— (carbon-carbon single bond), —C═C— (carbon-carbon double bond), —C—N— (carbon-nitrogen single bond), and —C═N— (carbon-nitrogen double bond). In this specification, "agglomerate" refers to a state in which a plurality of particles are agglomerated by a physical interaction such as an intermolecular force (force of attraction between molecules) without chemical bonds. The porous carbon material of the present invention is at least one selected from the group consisting of agglomerates in which a plurality of particles are agglomerated and aggregates in which a plurality of particles are connected.

The average particle size of particles constituting agglomerates or aggregates is preferably 5 nm to 250 nm, more preferably 10 nm to 100 nm, and still more preferably 25 to 50 nm. When the average particle size of the particles is set to be within the above range, it is possible to obtain agglomerates or aggregates having micropores, mesopores, and macropores that satisfy the requirements of the present invention.

The average particle size of the particles can be measured by observing agglomerates or aggregates under a scanning electron microscope (SEM). Alternatively, the average particle size of the particles can be measured as follows. Agglomerates or aggregates are disintegrated into primary particles by applying a strong physical stimulation with a homogenizer or the like in a solvent such as ethanol, which are then prepared into a dispersion having a low concentration (for example, 0.1 weight % dispersion), and the primary particles in the dispersion are observed under an SEM.

Whether the porous carbon material is single can be determined through thermogravimetric analysis (TGA), observation under a scanning electron microscope (SEM) or the like. For example, in the case of TGA, a weight reduction curve of the porous carbon material is measured through TGA, and if there is one drop point within the range of 150 to 850° C. in the obtained weight reduction curve, it can be determined that the material is a single porous carbon material. In the case of SEM, if carbon components with different shapes are not identified, it can be determined that the material is a single porous carbon material.

The pore diameters of micropores, mesopores, and macropores can be appropriately set depending on applications of the material (1). Typically, the pore diameter of the micropores is several nm or less, the pore diameter of the mesopores is several nm to several tens of nm, and the pore diameter of the macropores is several tens of nm or more.

In one preferable aspect, the micropores are defined as pores with a pore diameter of less than 2 nm, the mesopores are defined as pores with a pore diameter of 2 nm or more and 50 nm or less, and the macropores are defined as pores with a pore diameter of more than 50 nm. In examples described below, the volume percentages of the micropores, the mesopores, and the macropores are determined according to these definitions.

The lower limit of the pore diameter of the micropores is generally 0.4 nm according to the measurement limit by the gas adsorption method. The upper limit of the pore diameter of the macropores is, for example, 400 nm.

The total pore volume, the volume of micropores, and the volume of mesopores are each calculated by the BJH method from a nitrogen adsorption isotherm obtained by performing nitrogen adsorption/desorption measurement by the gas adsorption method.

The volume of macropores is calculated by subtracting the sum of the volume of micropores and the volume of mesopores from the total pore volume.

When the micropore volume percentage, the mesopore volume percentage, and the macropore volume percentage are each 13 volume % or more, functions of the porous carbon material (substance adsorption, storage, separation, filtration, etc.) and diffusibility of a substance are excellent.

When the macropore volume percentage is 13 volume % or more, the substance is likely to diffuse into the entire material (1) via macropores. In addition, when the micropore volume percentage is 13 volume % or more, the capillary phenomenon facilitates diffusion of the substance from macropores to mesopores and micropores. As a result, it is thought that the substance spreads evenly over the mesopore and micropores in the material (1), and functions of the porous carbon material can be sufficiently exhibited.

The micropore volume percentage is preferably 13 to 74 volume % and more preferably 30 to 74 volume %.

The mesopore volume percentage is preferably 13 to 74 volume % and more preferably 13 to 50 volume %.

The macropore volume percentage is preferably 13 to 74 volume % and more preferably 13 to 30 volume %.

However, a sum of the micropore volume percentage, the mesopore volume percentage, and the macropore volume percentage with respect to a total pore volume does not exceed 100 volume %.

The total pore volume of the material (1) is preferably 0.5 to 5.0 $cm^3/g$, more preferably 1.0 to 5.0 $cm^3/g$, and still more preferably 1.1 to 5.0 $cm^3/g$. When the total pore volume is equal to or more than the lower limit value, the diffusibility of the substance becomes superior, and when the total pore volume is equal to or less than the upper limit value, it is possible to increase the specific surface area.

The oil absorption of the material (1) is preferably 100 (ml/100 g) or more, more preferably 300 (ml/100 g) or more, and still more preferably 500 (ml/100 g) or more. When the oil absorption is equal to or more than the lower limit value, the function resulting from the adsorption of the material (1) is likely to be exhibited.

The oil absorption is a dibutyl phthalate (DBP) oil absorption defined in JIS K 6221.

The $CO_2$ gas absorption of the material (1) is preferably 1 (mol $CO_2$/kg) or more, more preferably 2 (mol $CO_2$/kg) or more, and still more preferably 4 (mol $CO_2$/kg) or more. When the $CO_2$ gas absorption is equal to or more than the lower limit value, the function resulting from the adsorption of the material (1) is likely to be exhibited.

The $CO_2$ gas absorption is determined by measuring the $CO_2$ adsorption isotherm.

The dye adsorption of the material (1) is preferably 50 (ml/g) or more, more preferably 150 (ml/g) or more, and still more preferably 300 (ml/g) or more. When the dye adsorption is equal to or more than the lower limit value, the function resulting from the adsorption of the material (1) is likely to be exhibited.

The dye adsorption is a methylene blue adsorption defined in JIS Z 2451.

The material (1) preferably has a peak in each of a micropore region (a region with a pore diameter of less than 2 nm), a mesopore region (a region with a pore diameter of 2 nm or more and 50 nm or less) and a macropore region (a region with a pore diameter of more than 50 nm) in the log differential pore volume distribution. When each region has a peak, the diffusibility becomes more superior.

The log differential pore volume distribution is a distribution curve obtained by plotting the pore diameter on the horizontal axis and the log differential pore volume on the vertical axis based on the results of measurement by the gas adsorption method. The log differential pore volume is a value (dV/d(log D)) obtained by dividing the differential pore volume dV by the logarithmic difference value d(log D) of the pore diameter.

The pore diameter at the peak top of the mesopore region is preferably 2 to 50 nm and more preferably 5 to 30 nm. The realization of electric double layer capacitance (electrostatic capacitance) of the capacitor is triggered by adsorption/desorption of electrolyte ions into/from the active material. Here, the size of solvated electrolyte ions is 1.6 to 2.0 nm in many cases, and for example, when TEA-BF4 (tetraethyl ammonium tetrafluoroborate) is used, the size of cations is 1.96 nm, and the size of anions is 1.71 nm. When the pore diameter at the peak top of the mesopore region is within the above range, the number of mesopores that can adsorb/desorb electrolyte ions increases and the electrostatic capacitance is improved.

Here, as the electrolyte, both an aqueous electrolytic solution and an organic electrolytic solution containing an ionic solution can be used.

Examples of aqueous electrolytic solutions include known aqueous electrolytic solutions such as an aqueous solution containing 1 M KOH, and an aqueous solution containing 1 M $H_2SO_4$.

Examples of organic electrolytic solutions include known ionic solutions such as a polycarbonate solution containing 1 M tetrabutylammonium tetrafluoroborate, a polycarbonate solution containing 1 M lithium tetrafluoroborate, a polycarbonate solution containing 1 M lithium tetrafluoroborate, and a triethylmethylammonium bis(trifluoromethanesulfonyl)imide solution, and organic electrolytic solutions.

Examples of cationic electrolyte ions include metal ions such as lithium ions and potassium ions; and known cationic electrolyte ions such as quaternary ammonium ions, for example, tetrabutylammonium ions.

Examples of anionic electrolyte ions include known anionic electrolyte ions such as $OH^-$, $PF_6^-$, $BF_4^-$, and imide-based anions.

The pore diameter at the peak top of the macropore region is preferably 50 to 200 nm and more preferably 50 to 100 nm. When the pore diameter at the peak top of the macropore region is equal to or more than the lower limit value, the diffusibility of the substance becomes superior, and when the pore diameter is equal to or less than the upper limit value, it is possible to increase the specific surface area.

The difference between the pore diameter at the peak top of the mesopore region and the pore diameter at the peak top of the macropore region is preferably 10 to 200 nm and more preferably 30 to 100 nm. When the difference between respective pore diameters is equal to or more than the lower limit value, the mixture permeability becomes superior, and when the difference is equal to or less than the upper limit value, the selectivity of the substance becomes superior.

The shape of the material (1) is not particularly limited, and is, for example, granular.

when the material (1) is granular, the average particle size is preferably 0.05 to 3,000 μm and more preferably 0.1 to 1,000 μm. When the average particle size is equal to or more than the lower limit value, the selectivity of the substance becomes superior, and when the average particle size is equal to or less than the upper limit value, it is possible to reduce functional problems due to interfaces.

The average particle size is determined by measuring the dry particle size distribution according to laser scattering.
<Method of Producing Material (1)>

The material (1) can be produced by, for example, a production method including a step of firing a metal-organic framework (hereinafter also referred to as "MOF") or a mixture containing MOF and other substances (firing step).

As necessary, before the firing step, a step of producing an MOF may be provided.

When the MOF is fired, as necessary, before the firing step, in order to adjust the average particle size of the finally obtained material (1), a step of pulverizing the MOF may be provided.

When a mixture containing an MOF and other substances is fired, before the firing step, a step of mixing an MOF and other substances may be provided, and a step of applying or molding the mixture according to the shape of the finally obtained material (1) may be provided.
(MOF)

The MOF is a framework in which metal ions and organic bridging ligands (multidentate ligand having two or more coordinating functional groups) are continuously bonded, and is a porous component having a plurality of pores therein.

The MOF is not particularly limited as long as it complies with MOF definitions, and has a pore distribution that can satisfy the above micropore volume percentage, mesopore volume percentage, and macropore volume percentage. For the MOF, MOFs with a plurality of metals, a metal oxide, a metal cluster or a metal oxide cluster structural unit are known, but the present invention is not limited thereto.

Examples of metal atoms included in the MOF include zinc, cobalt, niobium, zirconium, cadmium, copper, nickel, chromium, vanadium, titanium, molybdenum, magnesium, iron, and aluminum atoms. However, the metal atoms included in the MOF are not limited thereto. The metal atoms included in the MOF may be of one type or two or more types.

As a metal raw material for the MOF, complexes containing metal ions such as $Zn^{2+}$, $Cu^{2+}$, $Ni^{2+}$, and $Co^{2+}$ and metal-containing secondary structural units (SBU) are suitable.

The coordinating functional group of the organic bridging ligand may be a functional group that can be coordinated to a metal atom, and examples thereof include a carboxyl group, an imidazole group, a hydroxyl group, a sulfonic acid group, a pyridine group, a tertiary amine group, an amide group, and a thioamide group. Among these, a carboxy group is preferable. Two or more coordinating functional groups that the organic bridging ligand has may be the same as or different from each other.

As an organic bridging ligand, typically, a ligand in which two or more coordinating functional groups are substituted with a framework having a rigid structure (for example, an aromatic ring, an unsaturated bond, etc.) may be used.

Specific examples of organic bridging ligands include the following examples, but the present invention is not limited thereto.

Examples of organic bridging ligands include any tricarboxylic acid having a phenyl group such as 1,3,5-tris(4-carboxyphenyl)benzene (BTB); any dicarboxylic acid having a phenyl group such as 1,4-benzenedicarboxylic acid (BDC), 2,5-dihydroxy-1,4-benzenedicarboxylic acid (DOBDC), cyclobutyl-1,4-benzenedicarboxylic acid (CB BDC), 2-amino-1,4-benzenedicarboxylic acid (H2N BDC), tetrahydropyrene-2,7-dicarboxylic acid (HPDC), terphenyl dicarboxylic acid (TPDC), 2,6-naphthalene dicarboxylic acid (2,6-NDC), pyrene-2,7-dicarboxylic acid (PDC), and biphenyl dicarboxylic acid (BPDC); any tetracarboxylic acid having a phenyl group such as 3,3',5,5'-biphenyltetracarboxylic acid; and compounds having an imidazole group such as imidazole, 2-methylimidazole, benzimidazole, 2-nitroimidazole, cyclobenzimidazole, imidazole-2-carboxaldehyde, 4-cyanoimidazole, 6-methylbenzimidazole, and 6-bromobenzimidazole.

The organic bridging ligands included in MOF may be of one type or two or more types.

Specific examples of MOF include the following examples, but the present invention is not limited thereto.

MOF-177 represented by $Zn_4O(1,3,5$-benzenetribenzoate$)_2$; MOF-5 represented by $Zn_4O(1,4$-benzenedicarboxylate$)_3$, also known as IRMOF-I; MOF-74 (Mg) represented by $Mg_2(2,5$-dihydroxy-1,4-benzenedicarboxylate); MOF-74 (Zn) represented by $Zn_2(2,5$-dihydroxy-1,4-benzenedicarboxylate); MOF-505 represented by $Cu_2(3,3',5,5'$-biphenyltetracarboxylate); IRMOF-6 represented by $Zn_4O(cy$-clobutyl-1,4-benzenedicarboxylate); IRMOF-3 represented by $Zn_4O(2$-amino-1,4-benzenedicarboxylate$)_3$; IRMOF-11 represented by $Zn_4O(terphenyl$ dicarboxylate$)_3$ or $Zn_4O$ (tetrahydropyrene-2,7-dicarboxylate$)_3$; IRMOF-8 represented by $Zn_4O(tetrahydropyrene$-2,7-dicarboxylate$)_3$; ZIF-8 represented by $Zn(2$-methylimidazolate$)_2$; ZIF-68 represented by $Zn$(benzimidazolate)(2-nitroimidazolate); ZIF-69 represented by $Zn$(cyclobenzimidazolate)(2-nitroimidazolate); ZIF-7 represented by $Zn$(benzimidazolate$)_2$; ZIF-9 represented by $Co$(benzimidazolate$)_2$; ZIF-11 represented by $Zn_2$(benzimidazolate); ZIF-90 represented by $Zn$(imidazolate-2-carboxaldehyde$)_2$; ZIF-82 represented by $Zn$(4-cyanoimidazolate)(2-nitroimidazolate); ZIF-70 represented by $Zn$(imidazolate)(2-nitroimidazolate); ZIF-79 represented by $Zn$(6-methylbenzimidazolate)(2-nitroimidazolate); and ZIF-81 represented by $Zn$(6-bromobenzimidazolate)(2-nitroimidazolate) and the like.

As the MOF, ZIF such as ZIF-8 is preferable. ZIF is a material having a zeolite-like topology containing zinc or cobalt as a metal, and an imidazole-based organic bridging ligand (imidazole, benzimidazole, 2-nitroimidazole, 2-methylimidazole, cyclobenzimidazole, imidazole-2-carboxaldehyde, 4-cyanoimidazole, 6-methylbenzimidazole, 6-bromobenzimidazole, etc.) as an organic bridging ligand. When ZIF is used as the MOF, it tends to be easier to obtain a material having a micropore volume percentage of 13 volume % or more, a mesopore volume percentage of 13 volume % or more, and a macropore volume percentage of 13 volume % or more compared to the case of using other MOFs.

The MOF typically has a crystal structure. Since the MOF has an ordered structure, it crystallizes easily and is easily obtained as single crystals or polycrystals. The crystals may be single crystals or polycrystals.

The median value of the size of the crystal structure is preferably 10 nm to 1,000 μm and more preferably 30 nm to 100 μm. When the median value of the size of the crystal structure is equal to or more than the lower limit value, a specific surface area becomes superior, and when the median value is equal to or less than the upper limit value, the diffusibility of the substance and the dispersibility of crystals become superior.

The median value of the size of the crystal structure of the MOF is measured by the following method.

A scanning electron microscope or an optical microscope is used to obtain an image of the surface of the sample. The magnification in this case is a magnification at which the number of crystals (MOF) present in the image is 100 to 200. The maximum diameters of all crystals present in the obtained image are measured, the median value thereof (the average value of the minimum value and the maximum value) is calculated, and this value is used as the median value of the size of the crystal structure of the MOF.

Commercially available MOFs may also be used, and those produced by a known production method may be used. Examples of MOF production methods include methods described in WO 2019/039509.

Depending on the MOF production method and production conditions, there is a difference in the size of the crystal structure of the produced MOF and in the amount of the metal oxide contained, and there is a difference in the pore distribution of the MOF.

When this method is explained taking as an example the method described in WO 2019/039509, this method produces an MOF by stimulating a composition containing a substance (A) (excluding MOF) containing metal atoms constituting the MOF, an organic substance (B) having two or more metal coordination moieties that can produce crystals in coordination with the metal atoms, and a coordination accelerator (C) that reacts or undergoes a phase transition upon stimulation and can promote coordination of metal coordination moieties of the organic substance (B) to metal atoms of the substance (A). In the above method, the type and equivalent of the coordination accelerator (C) affects the pore distribution of the produced MOF. For example, when a base (for example, amine-borane complexes, dicyandiamides, hydrazides, imines, oxazolidines, pyridines, tertiary amines, ketoprofen amine salts, secondary amines, primary amines, or mixtures thereof, etc.) as the coordination accelerator (C) is added in an amount equal to or more than the organic substance (B), it is easy to obtain an MOF having a pore distribution that can satisfy the above micropore volume percentage, mesopore volume percentage, and macropore volume percentage. On the other hand, when the amount of the base added is small, the yield of the produced MOF tends to be low.

Here, generally, MOFs have no mesopores. Mesopores are formed by firing.

(Mixture)

Other substances mixed with the MOF may be inorganic substances or organic substances.

Examples of inorganic substances include water, inorganic acids, and inorganic bases.

Examples of organic substances include organic solvents, resins, sugars, proteins, and naturally derived substances.

When water or an organic solvent is contained as other substances, the mixture can be applied.

Examples of organic solvents include dimethylformamide, dimethyl sulfoxide, lactone, and ethanol. These organic solvents may be used alone or two or more thereof may be used in combination.

When a resin is contained as other substances, the mixture can be applied or molded.

The resin may be a resin having a main chain composed of carbon atoms or a resin containing atoms other than carbon atoms in the main chain (a polyether resin, a silicone resin, etc.).

Examples of resins include a thermoplastic resin and a curable resin. The molecular weight of the thermoplastic resin may be within a range in which molding is possible, and for example, 5,000 to 1,000,000. Examples of curable resins include a thermosetting resin and a photocurable resin.

Specific examples of resins include the following examples, but the present invention is not limited thereto. Here, the (meth)acrylate is acrylate or methacrylate.

Polyolefin resins such as polyethylene, polypropylene, polybutadiene, and polyisoprene; poly(meth)acrylate resins such as polymethyl (meth)acrylate, polybutyl (meth)acrylate, and poly(meth)acrylate hexyl; polyvinyl ester resins such as polyvinyl acetate and polyvinyl butyral; polyvinyl ether resins such as polyvinyl phenyl ether; polyvinyl halide resins such as polyvinyl chloride; polystyrene resins such as polystyrene and polymethylstyrene; polyvinyl ester resins such as polydimethyl maleate and polydimethylfumarate; polyamide resins such as Nylon 66; polyimide resins; polyester resins such as polyethylene terephthalate; cellulose resins such as cellulose and cellulose acetate; alkyd resins; polyurethane resins; polylactic acid; polyoxyalkylene resins such as polyethylene oxide and polypropylene oxide; polycarbonate resins; epoxy resins; furan resins; main chain aromatic high-performance polymers; benzoxazine resins, and the like. These copolymers, complexes, mixtures and the like can also be used. These resins may be used alone or two or more thereof may be used in combination.

The SP value of the resin is preferably 15 to 25 $(MPa)^{1/2}$ and more preferably 16 to 23 $(MPa)^{1/2}$. When the SP value is within the above range, the MOF and the resin interact appropriately, and detachment does not occur easily at the interface between the MOF and the resin even if stress is applied during or after production of the mixture (for example, during molding).

Here, when the resin is a curable resin, the SP value of the resin is an SP value of the curable resin after curing.

The SP value is the square root of the cohesive force of the material, and is a unique value depending on the composition and structure of the material. The cohesive force of the material is composed of dispersion, polarity, and hydrogen bond components. Among these, the difference in the dispersion force depending on the type of molecules is relatively small. On the other hand, the polarity and hydrogen bonds differ greatly depending on functional groups that the molecules have. Generally, molecules having a large polarity have a large polarity interaction between molecules and have a large SP value. Hydrogen-bondable molecules have a large cohesive force due to the hydrogen bond, and as a result, have a large SP value.

Although several types of SP values are known, the SP value in the present invention is the Hansen solubility parameter. For example, the SP value can be known from documents such as Polymer Handbook (4th edition, 1999, VII/675 page). In addition, the SP value can be roughly estimated from the type of functional groups if the structure of molecules is known.

As a method of mixing an MOF and other substances, various known mixing methods can be appropriately used.

In the mixture, the MOF content with respect to 100 mass % of the mixture is preferably 0.1 to 30 mass % and more preferably 1 to 10 mass %. When the MOF content is equal to or more than the lower limit value, the dispersibility becomes superior, and when the MOF content is equal to or less than the upper limit value, coatability is excellent.

(Firing Step)

A porous carbon material is obtained by firing the MOF or the mixture.

Firing conditions include, for example, conditions in which firing is performed under an inert gas atmosphere at 300 to 1,000° C. for 0.5 to 10 hours. The firing method is not particularly limited, and a known firing method used for carbonizing an organic substance can be used. Examples of inert gases include nitrogen gas and argon. The amount of the remaining MOF-derived metals or metal oxides can be controlled depending on the firing time.

When a granular material (1) is produced, after the firing step, as necessary, the obtained porous carbon material may be subjected to an activation treatment or a chemical treatment in order to increase the specific surface area. The activation treatment or chemical treatment may be performed by known methods. Depending on applications of the material, since the residual metals may have an influence, if the obtained porous carbon material is subjected to a metal removal treatment after firing, it is possible to control the amount of residual metals. Metal removal can be performed by a known method such as an acid treatment.

<Use of Material (1)>

The material (1) can be used as various functional materials such as a gas adsorption material, a liquid adsorbent, an ion adsorption material, a solid adsorbent, an electrode material, a separation material, a sensor material, a spacer material, and a reinforcing material by utilizing functions (adsorption, storage, separation, and filtration of substances and selective use of these, etc.) of the porous carbon material.

Hereinbelow, examples of the electrode material are given.

Examples of electrode materials containing the material (1) include those including a current collector and an active material layer provided in contact with the current collector and in which the active material layer contains the material (1).

Figure 2:
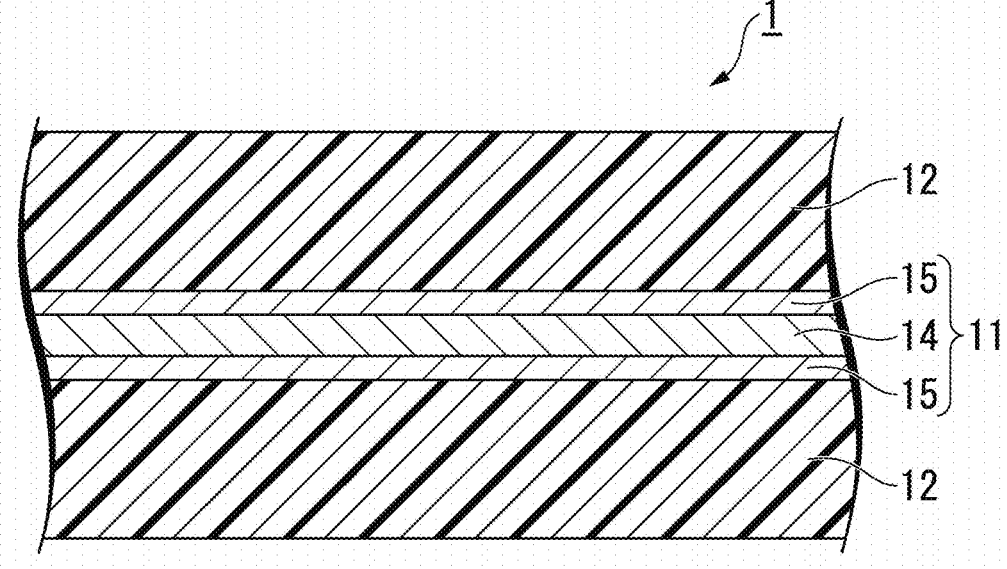
FIG. 2 is a cross-sectional view schematically showing an example of a positive electrode for a secondary battery.

In the example of FIG. 2, a positive electrode current collector 11 includes a positive electrode current collector main body 14 and a current collector coating layer 15 that covers the surface of the positive electrode current collector main body 14 on the side of a positive electrode active material layer 12. Only the positive electrode current collector main body 14 may be used as the positive electrode current collector 11.

Figure 3:
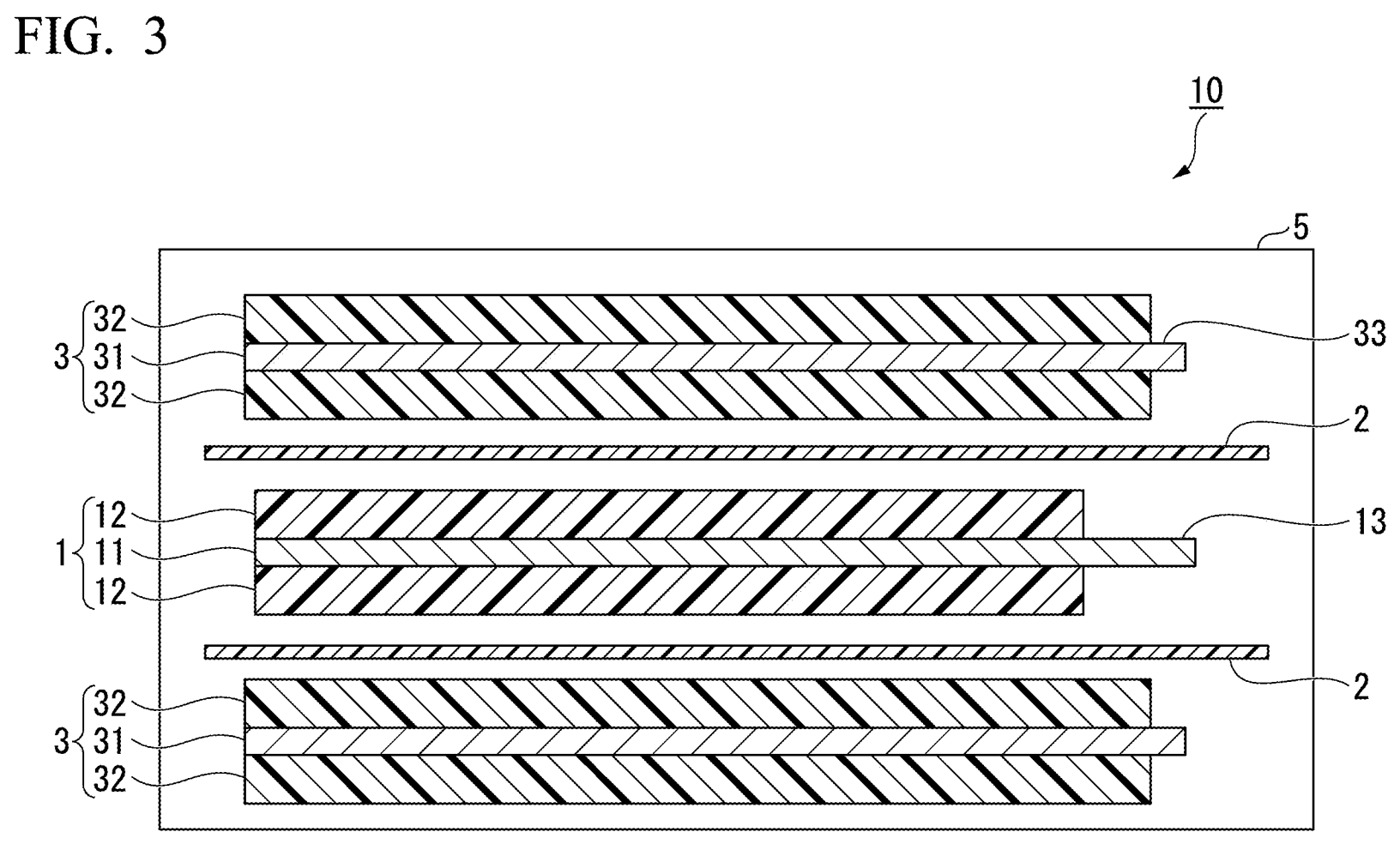

In the example of FIG. 3, a secondary battery 10 includes a positive electrode 1 for a secondary battery, a negative electrode 3, and a non-aqueous electrolyte, and may further include a separator 2. In the drawing, the reference numeral 5 is the exterior body. The positive electrode 1 includes the plate-like positive electrode current collector 11 and the positive electrode active material layer 12 provided on both surfaces thereof. The positive electrode active material layer 12 is present on a part of the surface of the positive electrode current collector 11. The edge of the surface of the positive electrode current collector 11 is a positive electrode current collector exposed part 13 in which the positive electrode active material layer 12 is not present. A terminal tab (not shown) is electrically connected to a predetermined part of the positive electrode current collector exposed part 13. The negative electrode 3 includes a plate-like negative electrode current collector 31 and a negative electrode active material layer 32 provided on both surfaces thereof. The negative electrode active material layer 32 is present on a part of the surface of the negative electrode current collector 31. The edge of the surface of the negative electrode current collector 31 is a negative electrode current collector exposed part 33 in which the negative electrode active material layer 32 is not present. A terminal tab (not shown) is electrically connected to a predetermined part of the negative electrode current collector exposed part 33.

Examples of materials of current collectors include nickel, aluminum, copper, iron, and stainless steel (SUS).

Examples of shapes of current collectors include a sheet shape. The sheet may be a porous component such as a mesh or foam or a non-porous component such as a foil.

The thickness of the sheet-like current collector is, for example, 10 to 100 μm.

The active material layer may be composed of only the material (1), and may further contain a component other than the material (1).

As other components, known components to be contained in the active material layer can be used, and examples thereof include additives such as a conductive agent and a binder.

Examples of conductive agents include ketjen black and carbon nanotubes.

Examples of binders include polyacrylonitrile and cellulosic polymers.

The amount of the material (1) with respect to a total mass of the active material layer is preferably 60 to 100 mass % and more preferably 90 to 99 mass %.

The amount of the conductive agent with respect to a total mass of the active material layer is preferably 0 to 15 mass % and more preferably 1 to 10 mass %.

The amount of the binder with respect to a total mass of the active material layer is preferably 0 to 10 mass % and more preferably 0 to 5 mass %.

The electrode material can be produced by, for example, mixing the material (1), a medium, as necessary, other components to prepare a paste-like composition, applying or impregnating a current collector with the obtained composition, and performing drying (removing the medium).

As the medium, for example, an organic solvent, water, or a mixture of an organic solvent and water can be used. Examples of organic solvents include N-methylpyrrolidone and dimethylformamide.

The electrode material containing the material (1) can be used, for example, an electrode of an electric double layer capacitor or an electrode of a hybrid capacitor.

[Material (2)]

A material according to another aspect of the present invention (hereinafter also referred to as a "material (2)") is a composite material in which a metal or metal oxide is supported on a single porous carbon material having micropores, mesopores and macropores, and in the porous carbon material, the micropore volume percentage is 13 to 74 volume %, the mesopore volume percentage is 13 to 75 volume %, and the macropore volume percentage is 5 to 74 volume %.

The porous carbon material is the material (1) described above.

Examples of metals supported on the porous carbon material include platinum, gold, palladium, rhodium, ruthenium, zinc, iron, nickel, and cobalt. Examples of metal oxides include zinc oxide, cobalt oxide, nickel oxide, and iron oxide.

The amount of the metal or metal oxide supported with respect to a total mass of the material (2) may be, for example, 1 mass %.

The material (2) can be produced by supporting a metal or metal oxide on the material (1).

Examples of methods of supporting a metal or metal oxide on the material (1) include an immersion method, a compression immersion method, an AD method, and an electrolytic method, and additionally, general methods of supporting a metal or metal oxide on carbon can be applied. In this case, depending on the metal or metal oxide supported, the supporting rate can be controlled by changing the polarity by a general surface treatment for carbon, for example, an oxidation treatment, a solution treatment, a gas treatment or the like.

As in the case of the material (1), the material (2) can be used for various functional materials. Since a metal or metal oxide is supported, the material is particularly suitable as a catalyst.

[Material (3)]

A material according to still another aspect of the present invention (hereinafter also referred to as a "material (3)") is a composite material in which an organic substance is supported on a single porous carbon material having micropores, mesopores and macropores, and in the porous carbon material, the micropore volume percentage is 13 to 74 volume %, the mesopore volume percentage is 13 to 75 volume %, and the macropore volume percentage is 5 to 74 volume %.

The porous carbon material is the material (1) described above.

Examples of organic substances supported on the porous carbon material include sugars and proteins.

The amount of the organic substance supported with respect to a total mass of the material (3) may be, for example, 1 mass %.

The material (3) can be produced by supporting an organic substance on the material (1).

Examples of methods of supporting an organic substance on the material (1) include an immersion method, a compression immersion method, an AD method, an electrolytic method, a decompression method, and a kneading method. In this case, depending on the organic substance supported, the supporting rate can be controlled by changing the polarity by a general surface treatment for carbon, for example, an oxidation treatment, a solution treatment, a gas treatment or the like.

As in the case of the material (1), the material (3) can be used for various functional materials. Since an organic substance is supported, the material is particularly suitable as a sensor or separation.

[Material (4)]

A material according to yet another aspect of the present invention (hereinafter also referred to as a "material (4)") is a composite material in which an MOF is supported on a single porous carbon material having micropores, mesopores and macropores and in the porous carbon material, the micropore volume percentage is 13 to 74 volumes, the mesopore volume percentage is 13 to 75 volume %, and the macropore volume percentage is 5 to 74 volume %.

The porous carbon material is the material (1) described above.

Examples of MOFs supported on the porous carbon material include those described above.

The amount of MOF supported with respect to a total mass of the material (4) may be, for example, 1 mass %.

The material (4) can be produced by supporting an MOF on the material (1).

Examples of methods of supporting an MOF on the material (1) include an immersion method, a compression immersion method, an AD method, and an electrolytic method. In this case, depending on the MOF supported, the supporting rate can be controlled by changing the polarity by a general surface treatment for carbon, for example, an oxidation treatment, a solution treatment, a gas treatment or the like.

As in the case of the material (1), the material (4) can be used for various functional materials. Since an MOF is supported, the material is particularly suitable as a separator or a catalyst.

EXAMPLES

Next, the present invention will be described in more detail with reference to examples, but the present invention is not limited to these examples. "Parts" indicates "parts by mass".

Production Example 1: Synthesis of MOF

MOF was synthesized using 2-methylimidazole as an organic bridging ligand, zinc nitrate hexahydrate as a metal raw material, triethylamine as a reaction accelerator according to the following procedure.

2.5 g of 2-methylimidazole was added to 30 g of dimethylformamide (DMF), and stirred until the mixture was completely dissolved, and thereby an organic bridging ligand solution was obtained. Separately, 10 g of zinc nitrate hexahydrate was added to 30 g of dimethylformamide and stirred until the mixture was completely dissolved, and thereby a metal raw material solution was obtained. Respective solutions were mixed, and 12 g of trimethylamine was additionally added and mixed. When the obtained mixed solution was stirred at room temperature, crystals precipitated. Then, the crystals were filtered, washed, and dried to collect crystals. When the collected crystals were subjected to X-ray diffraction (XRD), they were confirmed to be ZIF-8 represented by Zn(2-methylimidazolate)₂.

Example 1

(Production of Porous Carbon Material)

The MOF (ZIF-8) obtained in Production Example 1 was pulverized in an agate mortar to obtain a pulverized product having an average particle size of 50 μm. The obtained pulverized product was transferred to a quartz glass tubular furnace and heated to 950° C. under an inert atmosphere. After being left for 1 hour, the pulverized product was naturally cooled to room temperature, and thereby a porous carbon material (MOFa1 (Zn)) was obtained.

(Measurement of Pore Volume/Pore Distribution)

The obtained porous carbon material was subjected to nitrogen adsorption/desorption measurement at 77K (−196° C.) using a gas adsorption amount measuring device BEL- SORP-max (commercially available from MicrotracBel Corp.). The total pore volume, volume of micropores, and the volume of mesopores were calculated from the obtained nitrogen adsorption isotherm using the BJH method. In addition, the volume of macropores was calculated by subtracting the sum of the volume of micropores and the volume of mesopores from the total pore volume. From these results, the micropore volume percentage, the mesopore volume percentage and the macropore volume percentage were calculated. The results are shown in Table 1.

Figure 4:
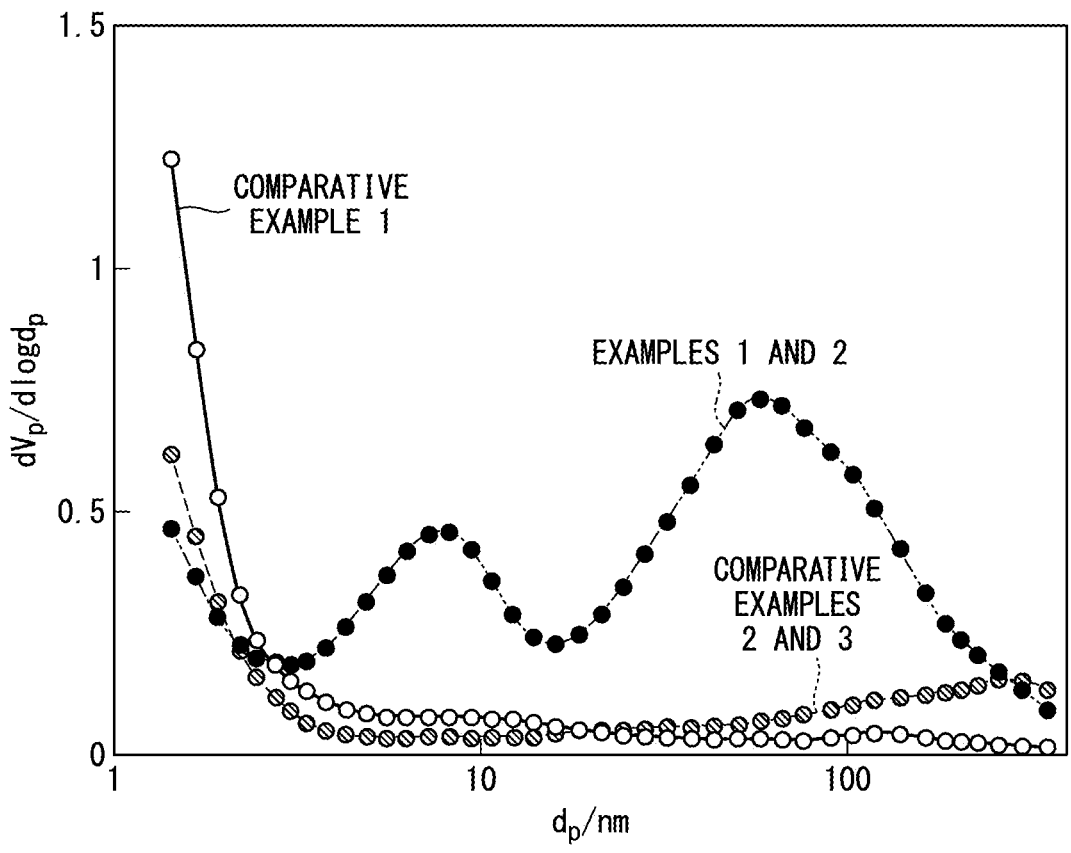
FIG. 4 is a diagram showing pore distributions (log differential pore volume distribution) of porous carbon materials used in Examples 1 and 2 and Comparative Examples 1 to 3.

In addition, a log differential pore volume distribution was determined from the nitrogen adsorption/desorption measurement results. The results are shown in FIG. 4. In FIG. 4, $D_p$ indicates a pore diameter, and $dV_p/dlogD_p$ indicates a log differential pore volume.

(Production of Capacitor Electrode Containing Porous Carbon Material)

80 parts of the obtained porous carbon material, 10 parts of a conductive agent (ketjen black), 10 parts of a binder (polyacrylonitrile), and 500 parts of an organic solvent (N-methylpyrrolidone) were mixed to obtain a paste. The obtained paste was impregnated into a Ni foam and dried under a reduced pressure at 150° C. for 30 minutes to obtain a capacitor electrode.

(Evaluation of Electrostatic Capacitance of Capacitor Electrode)

The obtained capacitor electrode was impregnated into an aqueous electrolytic solution (aqueous solution containing 1 M KOH), and using an Ag-based electrode as a reference electrode and a gold wire as a counter electrode, charging and discharging measurement was performed in a range of −0.8 to 0.0 V (vs Ag-based electrode) to obtain an electrostatic capacitance.

Comparative Example 1

The pore volume/pore distribution was measured, the capacitor electrode was produced and the electrostatic capacitance was evaluated in the same method as in Example 1 except that activated carbon that had been subjected to an activation treatment was used as the porous carbon material.

The pore volume/pore distribution measurement results are shown in Table 1 and FIG. 4.

In addition, Table 1 shows the electrostatic capacitance of the capacitor electrode of Comparative Example 1 when the electrostatic capacitance of the capacitor electrode of Example 1 was set to 100.

Comparative Example 2

The porous carbon material was produced, the pore volume/pore distribution was measured, the capacitor electrode was produced and the electrostatic capacitance was evaluated in the same method as in Example 1 except that a commercially available MOF (product name "Z1200", ZIF-8, commercially available from Aldrich CO. Ltd.) was used in place of the MOF obtained in Production Example 1.

The pore volume/pore distribution measurement results are shown in Table 1 and FIG. 4 (MOF1 (Zn)).

In addition, Table 1 shows the electrostatic capacitance of the capacitor electrode of Comparative Example 2 when the electrostatic capacitance of the capacitor electrode of Example 1 was set to 100.

Example 2

The electrostatic capacitance of the capacitor electrode produced in Example 1 was evaluated by the following method.

(Evaluation of Electrostatic Capacitance of Capacitor Electrode)

The obtained capacitor electrode was impregnated into an organic electrolytic solution (polycarbonate solution containing 1 M tetrabutylammonium tetrafluoroborate, hereinafter, referred to as "TBABF4"), and using an Ag-based electrode as a reference electrode and a gold wire as a counter electrode, charging and discharging measurement was performed in a range of −1.1 to 0.4 V (vs Ag-based electrode) to obtain an electrostatic capacitance.

The pore volume/pore distribution measurement results are shown in Table 2 and FIG. 4.

Comparative Example 3

The electrostatic capacitance of the capacitor electrode produced in Comparative Example 2 was evaluated in the same method as in Example 2.

The pore volume/pore distribution measurement results are shown in Table 2.

In addition, Table 2 shows the electrostatic capacitance of the capacitor electrode of Comparative Example 3 when the electrostatic capacitance of the capacitor electrode of Example 2 was set to 100.

Example 3

The porous carbon material was produced, the pore volume/pore distribution was measured, the capacitor electrode was produced and the electrostatic capacitance was evaluated in the same method as in Example 2 except that a porous carbon material (MOFa1' (Zn)) obtained by treating the MOF obtained in Production Example 1 with 1 N hydrochloric acid for 1 hour, and performing filtration and drying was used.

The pore volume/pore distribution measurement results are shown in Table 2.

In addition, Table 2 shows the electrostatic capacitance of the capacitor electrode of Example 3 when the electrostatic capacitance of the capacitor electrode of Example 2 was set to 100.

Example 4

The porous carbon material was produced and the pore volume/pore distribution was measured in the same method as in Example 1 except that 6.1 g of terephthalic acid as an organic bridging ligand was used in Production Example 1, and the capacitor electrode was produced and the electrostatic capacitance was evaluated in the same manner as in Example 2 (MOFb1 (Zn)).

The pore volume/pore distribution measurement results are shown in Table 2.

In addition, Table 2 shows the electrostatic capacitance of the capacitor electrode of Example 3 when the electrostatic capacitance of the capacitor electrode of Example 2 was set to 100.

Example 5

The porous carbon material was produced and the pore volume/pore distribution was measured in the same method as in Example 1 except that 1.1 g of terephthalic acid, 2.5 g of chromium nitrate nonahydrate as a metal salt, and 3.6 g of trimethylamine were used in Production Example 1, and the capacitor electrode was produced and the electrostatic capacitance was evaluated in the same manner as in Example 2 (MOFc1 (Cr)).

The pore volume/pore distribution measurement results are shown in Table 2.

In addition, Table 5 shows the electrostatic capacitance of the capacitor electrode of Example 5 when the electrostatic capacitance of the capacitor electrode of Example 2 was set to 100.

Example 6

The porous carbon material was produced and the pore volume/pore distribution was measured in the same method as in Example 1 except that 1.4 g of benzenetricarboxylic acid as an organic bridging ligand, 1.5 g of copper nitrate hexahydrate as a metal salt, and 3.6 g of trimethylamine were used in Production Example 1, and the capacitor electrode was produced and the electrostatic capacitance was evaluated in the same manner as in Example 2 (MOFd1 (Cu)).

The pore volume/pore distribution measurement results are shown in Table 2.

In addition, Table 2 shows the electrostatic capacitance of the capacitor electrode of Example 6 when the electrostatic capacitance of the capacitor electrode of Example 2 was set to 100.

Example 7

The porous carbon material was produced and the pore volume/pore distribution was measured in the same method as in Example 1 except that 2.4 g of benzenetricarboxylic acid as an organic bridging ligand, 1.3 g of aluminum nitrate nonahydrate as a metal salt, and 3.6 g of trimethylamine were used in Production Example 1, and the capacitor electrode was produced and the electrostatic capacitance was evaluated in the same manner as in Example 2 (MOFe1 (Al)).

The pore volume/pore distribution measurement results are shown in Table 2.

In addition, Table 2 shows the electrostatic capacitance of the capacitor electrode of Example 7 when the electrostatic capacitance of the capacitor electrode of Example 2 was set to 100.

Example 8

The electrostatic capacitance of the capacitor electrode produced in Example 1 was evaluated by the following method.
(Evaluation of Electrostatic Capacitance of Capacitor Electrode)

The obtained capacitor electrodes were allowed to face each other with a separator positioned therebetween, an organic electrolytic solution (polycarbonate solution containing 1 M lithium tetrafluoroborate, hereinafter referred to as "LiBF4") was injected, and charging and discharging measurement was performed in a range of 0 to 2.5 V to obtain an electrostatic capacitance.

Comparative Example 4

The electrostatic capacitance of the capacitor electrode produced in Comparative Example 3 was evaluated by the following method.

In addition, Table 3 shows the electrostatic capacitance of the capacitor electrode of Comparative Example 4 when the electrostatic capacitance of the capacitor electrode of Example 8 was set to 100.

Example 9

The porous carbon material was produced and the pore volume/pore distribution was measured in the same method as in Example 1 except that 14 g of zinc nitrate hexahydrate as a metal salt and 9.8 g of triethylamine were used in Production Example 1, and the capacitor electrode was produced and the electrostatic capacitance was evaluated in the same manner as in Example 8 (MOFa2 (Zn)).

The pore volume/pore distribution measurement results are shown in Table 3.

In addition, Table 3 shows the electrostatic capacitance of the capacitor electrode of Example 9 when the electrostatic capacitance of the capacitor electrode of Example 8 was set to 100.

Example 10

The porous carbon material was produced and the pore volume/pore distribution was measured in the same method as in Example 1 except that 21 g of zinc nitrate hexahydrate as a metal salt and 7.3 g of trimethylamine were used in Production Example 1, and the capacitor electrode was produced and the electrostatic capacitance was evaluated in the same manner as in Example 8 (MOFa3 (Zn)).

The pore volume/pore distribution measurement results are shown in Table 3.

In addition, Table 3 shows the electrostatic capacitance of the capacitor electrode of Example 10 when the electrostatic capacitance of the capacitor electrode of Example 8 was set to 100.

Example 11

The porous carbon material was produced and the pore volume/pore distribution was measured in the same method as in Example 1 except that 7.0 g of zinc nitrate hexahydrate as a metal salt and 16 g of triethylamine were used in Production Example 1, and the capacitor electrode was produced and the electrostatic capacitance was evaluated in the same manner as in Example 8 (MOFa4 (Zn)).

The pore volume/pore distribution measurement results are shown in Table 3.

In addition, Table 3 shows the electrostatic capacitance of the capacitor electrode of Example 11 when the electrostatic capacitance of the capacitor electrode of Example 8 was set to 100.

Example 12

The porous carbon material was produced and the pore volume/pore distribution was measured in the same method as in Example 1 except that 8.0 g of zinc nitrate hexahydrate as a metal salt and 9.1 g of trimethylamine were used in Production Example 1, and the capacitor electrode was produced and the electrostatic capacitance was evaluated in the same manner as in Example 8 (MOFa5 (Zn)).

The pore volume/pore distribution measurement results are shown in Table 3.

In addition, Table 3 shows the electrostatic capacitance of the capacitor electrode of Example 12 when the electrostatic capacitance of the capacitor electrode of Example 5 was set to 100.

TABLE 1

| Item | Type of MOF | Content of metal/ metal oxide | Micropore volume percentage % | Mesopore volume percentage % | Macropore volume percentage % | Total pore volume | Electrolytic solution | Electrostatic capacitance |
|---|---|---|---|---|---|---|---|---|
| Example 1 | MOFa1 (Zn) | 11% | 34.2 | 38.8 | 27.0 | 1.11 | Aqueous | 100 |
| Comparative Example 1 | — (activated carbon) | No data | 85.9 | 11.5 | 2.6 | 0.78 | Aqueous | 62 |
| Comparative Example 2 | Commercially available MOFa(Zn) | No data | 76.4 | 11.8 | 11.8 | 0.51 | Aqueous | 91 |

TABLE 2

| Item | Type of MOF | Content of metal/metal oxide | Micropore volume percentage % | Mesopore volume percentage % | Macropore volume percentage % | Total pore volume | Electrolytic solution | Electrostatic capacitance |
|---|---|---|---|---|---|---|---|---|
| Example 2 | MOFa1 (Zn) | No data | 34.2 | 38.8 | 27.0 | 1.11 | Organic (TBABF4) | 100 |
| Example 3 | MOFa1' (Zn) | 3% or less | 36.2 | 40.8 | 23.0 | 1.17 | Organic (TBABF4) | 108 |
| Comparative Example 3 | Commercially available MOFa(Zn) | No data | 76.4 | 11.8 | 11.8 | 0.51 | Organic (TBABF4) | 37 |
| Example 4 | MOFb1 (Zn) | No data | 36.1 | 37.1 | 28.7 | 1.67 | Organic (TBABF4) | 69 |
| Example 5 | MOFc1 (Cr) | No data | 36.2 | 36.4 | 27.4 | 0.42 | Organic (TBABF4) | 266 |
| Example 6 | MOFd1 (Cu) | No data | 15.1 | 62.4 | 22.5 | 0.20 | Organic (TBABF4) | 48 |
| Example 7 | MOFd1 (Al) | No data | 69.0 | 17.0 | 14.0 | 0.30 | Organic (TBABF4) | 170 |

30

TABLE 3

| Item | Type of MOF | Content of metal/metal oxide | Micropore volume percentage % | Mesopore volume percentage % | Macropore volume percentage % | Total pore volume | Electrolytic solution | Electrostatic capacitance |
|---|---|---|---|---|---|---|---|---|
| Example 8 | MOFa1 (Zn) | No data | 34.2 | 38.8 | 27.0 | 1.11 | Organic (LiBF4) | 100 |
| Comparative Example 4 | Commercially available MOFa(Zn) | No data | 76.4 | 11.8 | 11.8 | 0.51 | Organic (LiBF4) | 48 |
| Example 9 | MOFa2 (Zn) | No data | 18.7 | 50.7 | 30.6 | 2.09 | Organic (LiBF4) | 134 |
| Example 10 | MOFa3 (Zn) | No data | 19.8 | 70.8 | 9.4 | 3.63 | Organic (LiBF4) | 220 |
| Example 11 | MOFa4 (Zn) | No data | 27.2 | 15.3 | 57.5 | 0.91 | Organic (LiBF4) | 96 |
| Example 12 | MOFc5 (Zn) | No data | 65.3 | 16.2 | 18.5 | 0.77 | Organic (LiBF4) | 98 |

In Table 1, "electrostatic capacitance" indicates the rate of the electrostatic capacitance of each capacitor electrode of Example 1 and Comparative Examples 1 and 2 when the electrostatic capacitance of the capacitor electrode of Example 1 was set to 100.

In Table 2, "electrostatic capacitance" indicates the rate of the electrostatic capacitance of each capacitor electrode of Examples 2 to 7 and Comparative Example 3 when the electrostatic capacitance of the capacitor electrode of Example 2 was set to 100.

In Table 3, "electrostatic capacitance" indicates the rate of the electrostatic capacitance of each capacitor electrode of Examples 8 to 12 and Comparative Example 4 when the electrostatic capacitance of the capacitor electrode of Example 8 was set to 100.

The capacitor electrode of Example 1 using an aqueous electrolytic solution as an electrolytic solution had a better electrostatic capacitance than the capacitor electrodes of Comparative Examples 1 and 2. This is thought to have been caused by fact that the diffusibility of the electrolytic solution was improved.

The capacitor electrodes of Examples 2 to 7 using an organic (TBABF4) electrolytic solution as an electrolytic solution had a better electrostatic capacitance than the capacitor electrode of Comparative Example 3. This is thought to have been caused by fact that the diffusibility of the electrolytic solution was improved.

The capacitor electrodes of Examples 8 to 12 using an organic (LiBF4) electrolytic solution as an electrolytic solution had a better electrostatic capacitance than the capacitor electrode of Comparative Example 4. This is thought to have been caused by fact that the diffusibility of the electrolytic solution was improved.

Industrial Applicability

According to the present invention, it is possible to provide a material that functions as a porous carbon material and allows excellent diffusibility of a substance, a method of producing the same, a functional material using this material, and a material production method that allows a single porous carbon material having micropores, mesopores and macropores in a certain percentage or more to be produced.

REFERENCE SIGNS LIST

P Particle
G Aggregate
1 Positive electrode
2 Separator
3 Negative electrode
5 Exterior body
10 Non-aqueous electrolyte secondary battery
11 Positive electrode current collector
12 Positive electrode active material layer
13 Positive electrode current collector exposed part
14 Positive electrode current collector main body
15 Current collector coating layer
31 Negative electrode current collector
32 Negative electrode active material layer
33 Negative electrode current collector exposed part

The invention claimed is:

1. A porous carbon material which is a single porous carbon material having micropores, mesopores and macropores,
   wherein, with respect to a total pore volume, a volume percentage of the micropores is 13 to 74 volume %, a volume percentage of the mesopores is 13 to 75 volume %, and a volume percentage of the macropores is 5 to 74 volume %,
   wherein the porous carbon material includes agglomerates or aggregates containing a plurality of particles having a crystalline structure or a polyhedral structure, and
   wherein the particles have an average particle size of 2 nm to 500 nm.

2. The porous carbon material according to claim 1, wherein a volume ratio represented by [volume of macropores]/[volume of mesopores] is 1.1 to 4.0.

3. The porous carbon material according to claim 1, wherein a volume ratio represented by [volume of macropores]/[volume of micropores+volume of mesopores] is 0.14 to 1.5.

4. A composite material comprising the porous carbon material according to claim 1, and at least one selected from the group consisting of metals and metal oxides,
   wherein the at least one selected from the group consisting of metals and metal oxides is supported on the porous carbon material.

5. A composite material comprising the porous carbon material according to claim 1 and an organic substance,
   wherein the organic substance is supported on the porous carbon material.

6. A composite material comprising a porous carbon material and a metal-organic framework,
   wherein the porous carbon material is a single porous carbon material having micropores, mesopores and macropores,
   wherein, with respect to a total pore volume, a volume percentage of the micropores is 13 to 74 volume %, a volume percentage of the mesopores is 13 to 75 volume %, and a volume percentage of the macropores is 5 to 74 volume %, and
   wherein the metal-organic framework is supported on the porous carbon material.

7. A method for producing the porous carbon material according to claim 1, comprising
   a step of firing a metal-organic framework or a mixture containing a metal-organic framework and other substances.

8. A functional material comprising the porous carbon material according to claim 1, or
   a composite material comprising the porous carbon material according to claim 1 and a metal-organic framework,
   wherein the metal-organic framework is supported on the porous carbon material.

9. The functional material according to claim 8, which is an electrode material, a separation material, a sensor material, a spacer material, a reinforcing material, a gas adsorbent, a liquid adsorbent, an ion adsorbent, or a solid adsorbent.

* * * * *